O. S. PAYZANT.
INTERNAL COMBUSTION ENGINE.
APPLICATION FILED JUNE 19, 1916.
1,306,618.
Patented June 10, 1919.
3 SHEETS—SHEET 1.
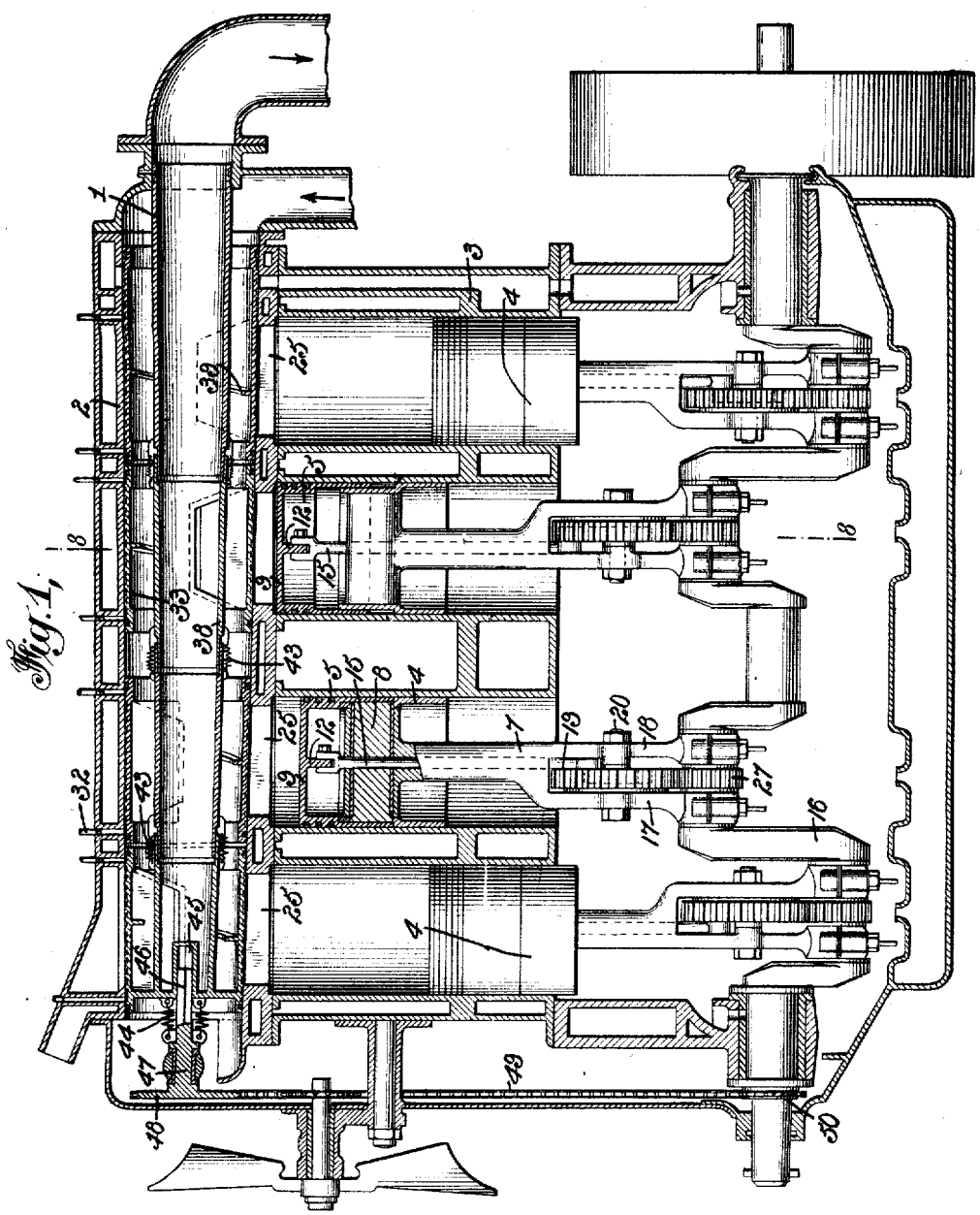
WITNESSES
L. Hauerstein
A. L. Kitchin.
INVENTOR
Octave S. Payzant
BY Munn & Co
ATTORNEYS

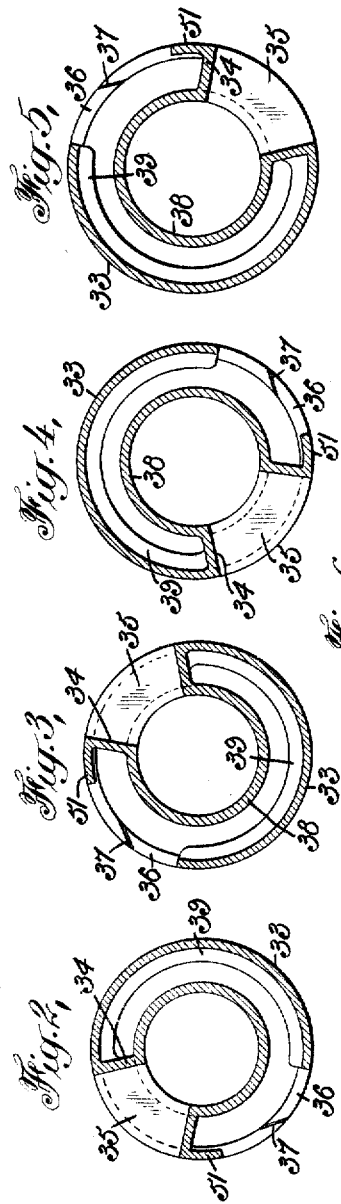
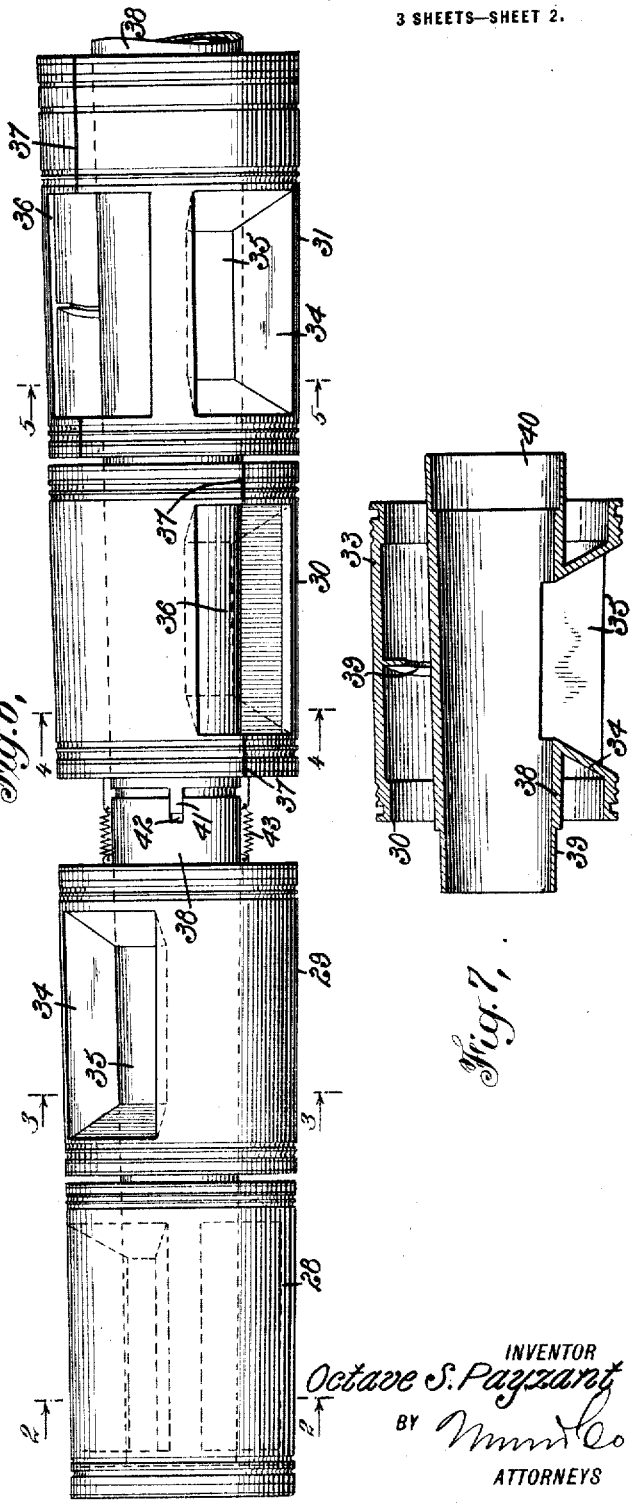

O. S. PAYZANT.
INTERNAL COMBUSTION ENGINE.
APPLICATION FILED JUNE 19, 1916.
1,306,618.
Patented June 10, 1919.
3 SHEETS—SHEET 3.
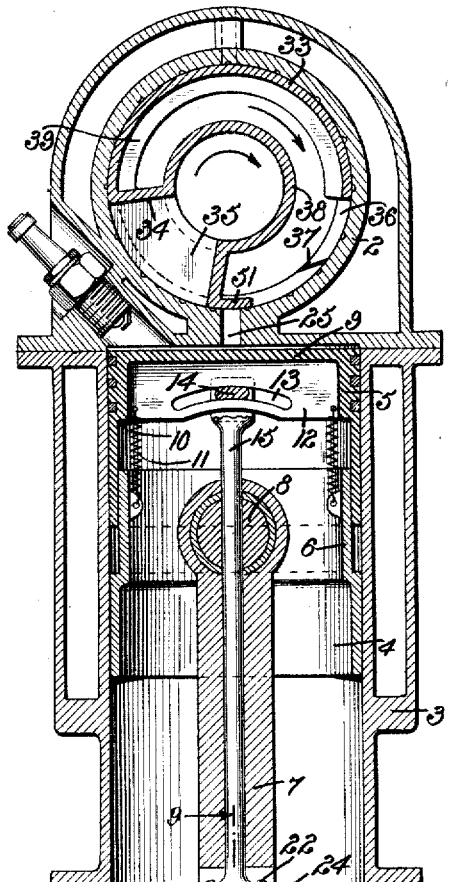
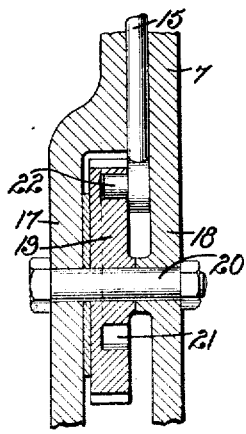
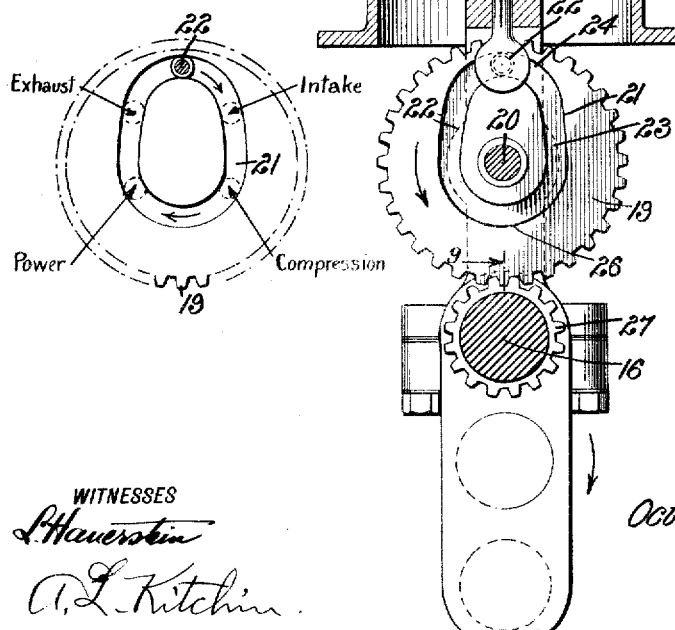
WITNESSES
INVENTOR
Octave S. Payzant
BY
ATTORNEYS

UNITED STATES PATENT OFFICE.

OCTAVE S. PAYZANT, OF NEW YORK, N. Y.

INTERNAL-COMBUSTION ENGINE.

1,306,618.	Specification of Letters Patent.	Patented June 10, 1919.

Application filed June 19, 1916. Serial No. 104,476.

*To all whom it may concern:*

Be it known that I, OCTAVE S. PAYZANT, a citizen of the United States, and a resident of the city of New York, borough of Manhattan, in the county and State of New York, have invented a new and Improved Internal-Combustion Engine, of which the following is a full, clear, and exact description.

This invention relates to internal combustion engines and has for an object the provision of an improved structure which is simple in its construction and efficient by reason of the fact that the full effect of each charge of explosive mixture is secured.

Another object in view is to produce an engine in which the cylinders are thoroughly and completely scavenged.

A still further object of the invention is to provide an engine with a movable or scavenging section and driving mechanism therefor associated with the driving shaft of the engine, the arrangement being such that the thrust of the piston on said driving shaft will not in any way affect said mechanism or said scavenging section.

A further object of the invention is to provide a rotary valve mechanism extending across the heads of all of the cylinders of the engine and connected up with the engine in such a manner as to provide a proper inlet and exhaust for the engine in proper time.

Another object of the invention is to provide a rotary valve for internal combustion engines in which the exhaust manifold will be arranged interiorly of the intake manifold whereby a heated mixture is supplied to the various cylinders.

In the accompanying drawings:—

Figure 1 is a longitudinal vertical section through an engine disclosing an embodiment of the invention.

Fig. 2 is a sectional view through Fig. 6 on line 2—2.

Fig. 3 is a sectional view through Fig. 6 on line 3—3.

Fig. 4 is a sectional view through Fig. 6 on line 4—4.

Fig. 5 is a sectional view through Fig. 6 on line 5—5.

Fig. 6 is a side view on an enlarged scale of the intake and exhaust manifolds shown in Fig. 1.

Fig. 7 is a longitudinal vertical section through one of the sections or parts of the construction shown in Fig. 6, the same disclosing how the central exhaust tube is formed integral with the outer tubular member forming the shut-off drum.

Fig. 8 is a fragmentary sectional view through Fig. 1 on line 8—8, the same being on an enlarged scale.

Fig. 9 is a sectional view through Fig. 8 on line 9—9.

Fig. 10 is a diagram showing the position of a cam and associated parts disclosing certain parts of the invention.

In constructing an engine embodying the invention an intake and exhaust manifold are especially provided and also a pison construction and associated parts are especially provided, but the location of the cylinders is of the usual arrangement and also the other parts may be substantially of the usual arrangement. As shown in Fig. 1 the engine is provided with a cooling water jacket and with the usual construction of crank shaft. In the construction shown in the drawings a four-cycle engine having four cylinders has been disclosed but it will be evident that the invention may be used on substantially any reciprocating engine with a greater or less number of cylinders, as may be desired.

Referring to the accompanying drawings by numerals, 1 indicates the rotary valve as a whole which is arranged in a suitably formed casing 2 extending transversely across the heads of the various cylinders. The casing 2 is preferably divided from the body 3 of the cylinders on line with or immediately below the upper end of the cylinders, as shown in Fig. 8, the parts being bolted or secured together in any suitable of well known manner. This allows the head 2 to be entirely lifted off when access to the interior of the cylinders is desired. It will be evident, however, that the division between body 3 and head 2 could be above the point indicated in Fig. 8 without in any way departing from the spirit of the invention, this particular division being merely for convenience.

The rotary valve 1 is constructed as hereinafter fully described so as to properly allow an intake and exhaust of the various cylinders in the proper time. In each of the cylinders is arranged a specially constructed piston 4, which piston is provided with a movable or telescoping section 5 slidingly fitting over an off-set portion 6 on piston 4. A connecting rod 7 is connected to the piston 4 by a pin 8 which is preferably of the usual construction. The movable section 5 is provided with an upper closed end 9 and a shoulder 10 which fits against the offset portion 6 of the piston 4 during the explosion stroke so that the power will be transmitted directly to the piston 4. A plurality of springs 11 connect the off-set portion 6 and the movable section 5 so as to aid the movable section to properly return to its closed position and thus take up any lost motion on the movable parts. During the explosion and compression strokes the movable section 5 remains in contact with the piston 4 but during the exhaust and intake strokes the section 5 moves upwardly and downwardly so as to thoroughly scavenge the cylinder. The extra movement upwardly beyond the upward movement of the piston is a quick movement, and after the upward movement has been completed a quick return or downward movement is produced, so that for approximately one-half of the time the movable section 5 is in contact with the piston 4.

In order to produce this quick upward and downward movement for thoroughly scavenging the cylinder, the section 5 of each piston is provided with a depending web 12 in which a slot 13 is positioned, said slot accommodating a pin 14, which pin is preferably somewhat flattened so as to properly slide in the slot and yet not allow any loose motion. The pin 14 is connected to an operating rod 15, which rod extends through a suitable bore in the connecting rod 7 and the pin 8. In relation to the connecting rod 7 it will be observed that the same is bifurcated at the lower end, the parts of the bifurcation being journaled on the driving shaft 16 in any suitable manner. Between the walls 17 and 18, as shown in Fig. 9, is arranged a gear wheel 19 journaled on pin 20, said gear wheel having a cam groove 21 for receiving the pin 22, which pin is connected with the rod 15. The shape of the groove 21 is such as to produce the movement above mentioned, namely, a quick upward movement during the exhaust stroke and a quick downward movement during the intake stroke, said movements being caused by the comparatively straight sections 22 and 23 of the groove 21. An arc-shaped section 24 is provided at one end of the groove, said arc-shaped section being approximately one-quarter of a circle, though this may be varied within wide limits, the arc, however, being long enough to hold the movable section 5 in its upward position until the port 25 has been closed by the valve 1 and the inlet port is about to open. In this way the exhaust gases are forced out and will not be drawn back into the cylinder but the suction begins to take place only when the inlet port of valve 1 is about to be uncovered.

On the opposite end of the cam groove 21 to the arc-shaped section 24 is a section 26 which is substantially a half circle, this section acting to hold the movable section 5 in its lowered or closed position during the compression and explosion strokes. The gear wheel 19 meshes with a pinion 27 which is rigidly secured to the crank shaft 16 and moves therewith so as to give motion to the gear wheel 19. The size of these gear wheels is such as to give the proper movement in connection with the movement of the connecting rod 7 and associated parts. In Fig. 10 a diagram is disclosed in which the movement of the pin 22 is shown. The construction of the rotary valve permits a reversal of the engine when back-firing without injuring or dislocating any of the parts. It will be observed that the power produced by the explosion is exerted directly on the piston 4 and is communicated by the piston to the connecting rod 7 and from thence to the crank shaft to be utilized in any desired way. This power does not in any way operate or act on the gear wheel 19 and pin 22 and associated parts so there is no likelihood of any of these parts getting out of order.

As shown more particularly in Figs. 1 to 7, inclusive, the valve 1 is arranged to extend across the top of the cylinder and is formed with tapering sections slidingly arranged in position in order that the parts may automatically adjust themselves so as to produce a tight fit but such a fit as will not pinch any moving part. This will take care of the expansion and contraction of the parts without producing any leaking when the engine is comparatively cool. The head or casing 2 is of the proper shape for receiving the various sections 28, 29, 30 and 31 of the valve 1 and is a complete uninterrupted bore from one end to the other except for the various ports 25, there being one port for each cylinder. It will be observed that the head 2 is open at both ends and tapers from one end to the other so that the sections 28 to 31, inclusive, may be readily fitted into position. Each of these sections is provided with packing rings and oil grooves so as to insure a tight joint and ample lubrication. The casing 2 is also provided with oil grooves, as more clearly shown in Fig. 8, the oil being supplied through suitable tubes 32. Each of the sections 28 to 31, inclusive, is formed as shown in the sectional view of section 30, disclosed in Fig. 7. The outer shell or drum 33 of section 30 tapers from one end to the other and merges into walls 34 surrounding the exhaust port 35. The inlet port 36 is merely an opening in the drum 33, as shown in Fig. 4. The drum 33 is divided at 37 for its full length so as to take up any contraction or expansion and prevent pinching. The drum 33 merges into walls 34 which walls in turn merge into the tapering tubular members 38 which form one section of the exhaust manifold. It will thus be seen that the exhaust manifold sections and the valve or shut-off drums 33 are formed of one piece and rotate together. A reinforcing web 39 is provided in the drum 33 which in addition to acting as reinforcing means acts as a fan for assisting in drawing in the explosive mixture which is to be eventually drawn into the various cylinders by suction produced therein.

It will be observed that a casing or drum 33 and its co-acting member 38 are provided for each of the cylinders, the adjacent tubular members 38 telescoping, one end of each member 38 being formed with a reduced portion 39 and the opposite end with a recess 40. To prevent any slight independent rotation of the respective sections 28 to 31, inclusive, tongues 41 on one section project into grooves 42 in the next adjacent section, these members being dovetailed if desired. As shown in Fig. 1 a plurality of springs 43 connect the various sections 28 to 31, these springs being of different strength, the weakest spring being between sections 30 and 31, the second weakest between sections 29 and 30 and the strongest between the sections 28 and 29. A set of springs 44 is provided at the extreme end of the valve 1 for resisting a longitudinal movement of the valve though allowing a sufficient movement to take up any expansion when the valve becomes heated. The section 28 is provided with a socket 45 preferably square in cross section for receiving a squared extension 46 of the shaft 42, which shaft is rigidly connected with a sprocket wheel 48. Sprocket wheel 48 accommodates chain 49, which chain passes over the sprocket wheel 50 rigidly secured to the crank shaft 16, the sprocket wheel 48 being twice the size of the sprocket wheel 50 so as to give a proper movement to the valve. It is evident that a different connection may be provided between the crank shaft and the valve 1, the only essential being that the valve 1 shall rotate at the proper speed in proportion to the rotation of the crank shaft. The extension 46 rotates the first section 28 of the valve 1 and rotary movement is transmitted therefrom by the various tongues 41 to the sections successively. By the use of these tongues and the various springs 43 each section is properly rotated and yet is permitted an independent movement so as to automatically adjust itself to properly fit the bore of casing 2 under all circumstances. The valve, pistons and associated parts have been arranged and adjusted to fire in the order of one, three, four, two, but it is evident that this order may be changed whenever desired and rearranged as occasion may demand.

In the construction of the parts it is evident that any suitable size may be used either in the proportion shown in Fig. 1 or any other proportion desired without departing from the spirit of the invention. In forming the casing or head 2 the same is provided with a bore tapering from one end of the head to the other, said bore forming the intake manifold and receiving the valve 1, which valve is provided with shut-off drums 33 having arranged interiorly thereof tubular members 38 which act as an exhaust manifold. The valve 1 is in fact made up of a number of independent sections, such as 28, 29, 30 and 31, which form valve drums open at both ends and provided with two ports, namely, an exhaust port and an inlet port. It will be observed that the exhaust manifold of each section extends through the center of the space through which the explosive mixture must pass, so that the full effect of the heating by the exhaust will be had and the explosive mixture will be drawn into the cylinders in the best possible condition. This arrangement results in the manifold of the engine being arranged interiorly of the casing, the intake manifold really being part of the head or casing 2. As just stated, the bore of the head or casing 2 acts as the intake manifold, but the explosive mixture is controlled by the various drums 33 which cause a proper opening and closing of the various ports 25 in order to allow a proper intake and exhaust.

In connection with the sprockets 48 and 50 it will be observed that the sprocket 48 is double the size of the sprocket 50, the valve drums, therefore, making one revolution to two crank revolutions, or one-quarter of a revolution to one upward or downward stroke of the piston. Preferably each valve port is slightly less in width than one-quarter of the drum circumference so that there will be no overlapping of the inlet and outlet. Upon an examination of Fig. 1 it will be observed that a single slot 25 in the head of each cylinder serves both intake and exhaust valves alternately. In connecting up the valve with the crank shaft the same is preferably arranged so that the valve will rotate in the same direction as the shaft, this resulting in the fact that on the upward exhaust stroke the exhaust port comes into opposing position with the cylinder head slot and maintains the valve open until the upward piston stroke is completed. The slot is then closed for an instant by the overhanging section 51 while the piston passes the dead center at the top of the stroke. In arranging the ports in valve 1 they have been placed at 90° intervals around the drum thereby insuring correct timing. In connection with the valve 1 means have been provided for thoroughly cleaning out and scavenging the various cylinders after each explosion, said means including the section 5 of the piston and the mechanism for operating the same, which mechanism itself is not acted upon directly and does not take up the strain of the force of the explosion. In this way a greater power is produced as all the compressed mixture or gas is perfectly clean and is also somewhat warmed and thereby better mixed. By having a pure explosive mixture the same need not be so rich in oil, thus reducing the consumption of fuel. This is augmented or assisted by the way in which the oil and air are heated for producing better carburization after the mixture has left the carbureter.

What I claim is:

1. In an internal combustion engine, a plurality of cylinders, a head extending across the end of all of said cylinders, said head having a tapering bore, and a port for each of said cylinders, a combined valve and inlet and outlet manifold arranged in said bore and divided into an independent drum or section for each of said cylinders, and springs for causing an independent and automatic adjustment of said drums as they wear and also as they expand and contract.

2. In an internal combustion engine of the character described, a plurality of cylinders, a valve mechanism therefor, said valve mechanism comprising a head extending across all of said cylinders provided with a single port extending into said cylinders, an independent drum arranged in said head opposite each of the cylinders, each of said drums being independently and automatically adjustable as they expand and contract, each of said drums being provided with an inner tubular member, said inner tubular member being provided with a passageway to the exterior of the drum, said drum being provided with a port whereby inlet and exhaust ports are produced, and means for rotating said drum and the tubular member arranged therein so as to bring the respective ports into registry at different times.

3. In an internal combustion engine of the character described, a plurality of cylinders provided with a head extending transversely thereof across all of the cylinders, said head being formed with a tapering bore and with a single port extending from said bore into each of said cylinders, said single bore acting as an inlet and an exhaust port, and a rotary valve mechanism arranged in said head, said valve mechanism tapering from one end to the other and comprising an inner and outer shell, the outer shell being formed with an opening acting as an intake port and the inner shell being provided with a passageway acting as an exhaust port, there being an opening in the passageway for each cylinder, said ports being adapted to be brought into registry at different times with the port in said head, whereby the valve mechanism also acts as intake and exhaust manifolds, said inner and outer shells being divided into independent drums, and means for causing said drums to independently remain in a tight but movable connection with the head.

4. In an internal combustion engine of the character described, a rotary valve adapted to extend across all of the cylinders of the engine, said valve being formed into sections, each section tapering from one end to the other, each of said sections being provided with an outer drum and an inner tubular member, said outer drum having a port therein and said inner tubular member having a comparatively wide passageway acting as a second port, means for holding the sections of said valve in alinement during the rotation thereof, and means for holding said sections resiliently against longitudinal movement whereby the sections will automatically take up any expansion or contraction of the parts of the valve and surrounding casing.

5. In an internal combustion engine of the character described, a rotary valve mechanism therefor, said valve mechanism including a casing or head extending across all of the cylinders of the engine, the head or casing being provided with a bore open at both ends and tapering from one end to the other and rotary sections arranged in said casing, there being one section for each cylinder, each of said sections comprising an outer drum fitting said bore and an inner tubular member, the respective inner tubular members somewhat telescoping at their point of contact, springs for resiliently connecting said tubular members together, and means connecting said tubular members for preventing independent rotation of said drums, said inner tubular members being provided with a passageway acting as an exhaust port and each of said drums being provided with an opening acting as an intake port, said ports being positioned so as to be brought successively past the port of the respective cylinders.

6. In an internal combustion engine of the character described, a plurality of cylinders, a head for said cylinders, said head having a tapering bore extending from one end to the other and a plurality of openings, there being one opening for each cylinder, said openings acting as both intake and exhaust ports for the cylinders, and a rotary valve member arranged in said head divided into independent sections, means for automatically adjusting said sections as they expand and contract, said valve member tapering from one end to the other and fitting said bore, said valve member being provided with a tubular member arranged therein, said tubular member having means defining a passageway opposite each of said cylinders, said passageway extending to the periphery of the valve member in order to act as exhaust ports, said valve member having openings in its periphery, there being one opening for each piston whereby the valve member exteriorly of the tubular inner member acts as a shut-off drum and the tubular inner member acts as an exhaust manifold, and means for rotating the valve member in proper timed relationship to the movement of the piston in said cylinders.

7. In an internal combustion engine of the character described, a cylinder, a head fitting on said cylinder and having an opening extending into the cylinder, a rotary valve member arranged in said casing, said rotary valve member tapering from one end to the other and said casing having a bore tapering from one end to the other, said valve member comprising an outer drum and an inner tubular member, said outer drum acting as shut-off drum and said inner tubular member acting as an exhaust manifold, said drum being formed with an opening adapted to be brought into registry with the opening of the head and said inner tubular member having a passageway extending to the periphery of the drum acting as an exhaust port, said valve member being divided into independent sections, means for independently and automatically adjusting said sections so as to always fit said bore, and means connecting the rotary valve member to the crank shaft of the engine so as to rotate the valve member in timed relationship with the movement of the piston.

8. In an internal combustion engine, a plurality of cylinders, a single head extending across the top of said cylinders, said head having openings extending into said cylinders and acting as both inlet and exhaust ports for the cylinders, said head having a tapering bore, a rotatable valve member arranged in said bore, said valve member being formed into a plurality of sections, there being one section for each cylinder, each of said sections comprising a drum fitting said bore in the head and an inner tubular member, said drum being provided with an opening acting as a port and said inner tubular member having a passageway acting as an exhaust port, the end of one tubular member telescoping over the end of the next adjacent tubular member, springs for connecting said tubular members whereby the tubular members and the drums connected therewith are allowed a longitudinal movement when expanding and are caused to move in the opposite direction when contracting so as to maintain a tight joint, means for rotating said valve member, and means acting on one end of said valve member for causing said drums to properly fit said bore.

9. In an internal combustion engine of the character described, a plurality of cylinders, a head extending across all of said cylinders, said head having a tapering bore and a slot extending from said bore into the cylinders so that there will be an opening in each cylinder acting as an inlet and an outlet port, and a rotary valve member arranged in said bore, said rotary valve member tapering from one end to the other and constructed in sections, there being one section for each cylinder, each section being provided with a drum fitting said bore and an interior tubular member, adjacent ends of the various tubular members being cut away so as to allow an overlap, a spring connecting adjacent tubular members, and an overlapping tongue connecting adjacent tubular members, said tongue being rigidly connected with one tubular member and slidingly fitting the other tubular member whereby each tubular member and the drum connected therewith may move longitudinally independently but all of the tubular members and drums must rotate simultaneously and in the same direction.

10. In an internal combustion engine of the character described, a plurality of cylinders, a head extending across said cylinders, said head having a tapering bore extending the full length of the head and a plurality of openings for providing communication between the respective cylinders and the bore, a rotary valve member arranged in said bore, said valve member being provided with an intake drum for each cylinder and an exhaust tube for each cylinder, said exhaust tubes being connected together and arranged interiorly of the drum so as to heat the intake as the same passes through the various drums, each of said drums being provided with a reinforcing web arranged spirally and acting in the duble capacity of a reinforcing member and as a fan for assisting the suction of the pistons.

OCTAVE S. PAYZANT.

Copies of this patent may be obtained for five cents each, by addressing the "Commissioner of Patents, Washington, D. C."